United States Patent
Park et al.

(10) Patent No.: US 9,544,037 B2
(45) Date of Patent: Jan. 10, 2017

(54) METHOD AND APPARATUS FOR INTERFERENCE CANCELLATION

(71) Applicant: LG Electronics Inc., Seoul (KR)

(72) Inventors: Hanjun Park, Seoul (KR); Kijun Kim, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 14/615,709

(22) Filed: Feb. 6, 2015

(65) Prior Publication Data
US 2015/0230259 A1 Aug. 13, 2015

Related U.S. Application Data

(60) Provisional application No. 61/936,887, filed on Feb. 7, 2014.

(51) Int. Cl.
*H04W 4/00* (2009.01)
*H04B 7/06* (2006.01)
*H04B 7/08* (2006.01)

(52) U.S. Cl.
CPC ............ *H04B 7/0626* (2013.01); *H04B 7/086* (2013.01); *H04B 7/0862* (2013.01)

(58) Field of Classification Search
None
See application file for complete search history.

(56) References Cited

U.S. PATENT DOCUMENTS

| | | | | |
|---|---|---|---|---|
| 2013/0088986 | A1* | 4/2013 | Xiao | H04W 72/0426 370/252 |
| 2014/0092878 | A1* | 4/2014 | Davydov | H04W 52/0258 370/336 |
| 2014/0126402 | A1* | 5/2014 | Nam | H04W 24/08 370/252 |
| 2015/0341942 | A1* | 11/2015 | Lee | H04B 7/0626 370/252 |
| 2015/0365152 | A1* | 12/2015 | Frenne | H04B 7/0626 370/252 |
| 2015/0372778 | A1* | 12/2015 | Xu | H04J 11/005 370/329 |
| 2015/0373732 | A1* | 12/2015 | Davydov | H04L 5/00 370/329 |
| 2016/0080963 | A1* | 3/2016 | Marinier | H04L 5/0053 370/252 |
| 2016/0095089 | A1* | 3/2016 | Wong | H04W 72/042 370/328 |
| 2016/0242188 | A1* | 8/2016 | Tiirola | H04W 72/082 |

* cited by examiner

*Primary Examiner* — Otis L Thompson, Jr.
(74) *Attorney, Agent, or Firm* — Morgan, Lewis & Bockius LLP

(57) ABSTRACT

A method and apparatus for performing interference cancellation is disclosed. The method includes receiving information about an interference configuration set related to characteristic of an interference signal, receiving an interference sequence signal indicating one interference configuration of the interference configuration set, and performing cancellation of the interference signal using the indicated interference configuration, wherein the interference sequence signal is received in at least a portion of a channel state information-interference measurement (CSI-IM) resource, and the interference sequence signal is received from an interference base station (BS) when the interference signal is scheduled to transmit and corresponds to the interference sequence signal.

14 Claims, 13 Drawing Sheets

METHOD AND APPARATUS FOR INTERFERENCE CANCELLATION

This application claims the benefit of U.S. Provisional Application No. 61/936,887, filed on Feb. 7, 2014, which is hereby incorporated by reference as if fully set forth herein.

BACKGROUND OF THE INVENTION

Field of the Invention

The present invention relates to a wireless communication system, and more particularly, to a method and apparatus for performing interference cancellation.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for performing interference cancellation that substantially obviates one or more problems due to limitations and disadvantages of the related art.

An object of the present invention is to provide a method and apparatus for interference cancellation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing interference cancellation in a wireless communication system, which is performed by a terminal includes receiving information about an interference configuration set related to characteristic of an interference signal, receiving an interference sequence signal indicating one interference configuration of the interference configuration set, and performing cancellation of the interference signal using the indicated interference configuration, wherein the interference sequence signal is received in at least a portion of a channel state information-interference measurement (CSI-IM) resource, and the interference sequence signal is received from an interference base station (BS) when the interference signal is scheduled to transmit and corresponds to the interference sequence signal.

Alternatively or additionally, the interference configuration set may be configured with one or more interference configurations, and each interference configuration may include a plurality of fields indicating characteristic of the interference signal.

Alternatively or additionally, the method may further include receiving information of time in which the interference configuration set or separate interference configuration can be effectively used.

Alternatively or additionally, the interference sequence signal may be mapped to each resource element (RE) corresponding to the at least a portion of the CSI-IM resource for all antenna ports, and a seed value of the interference sequence signal may be changed for the each RE according to a frequency, time, and a transmission antenna port.

Alternatively or additionally, the interference sequence signal may be mapped to a resource element (RE) corresponding to at least a portion of the CSI-IM resource by applying an orthogonal cover code (OCC), and a seed value of the interference sequence signal may be changed for the each RE according to a frequency, time, and a transmission antenna port.

Alternatively or additionally, a seed value of the interference sequence signal may be changed according to an interference configuration set or separate interference configuration configured for each respective frequency resource unit.

Alternatively or additionally, a seed value of the interference sequence signal may be determined according to an offset value based on at least one of an index of a transmission antenna port and a frequency domain in which the interference signal is transmitted or a subframe index in which the interference sequence signal is transmitted.

In another aspect of the present invention, a terminal configured to perform interference cancellation in a wireless communication system includes a radio frequency (RF) unit, and a processor configured to configure the RF unit, wherein the processor is configured to receive information about an interference configuration set related to characteristic of an interference signal, to receive an interference sequence signal indicating one interference configuration of the interference configuration set, and to perform cancellation of the interference signal using the indicated interference configuration, wherein the interference sequence signal is received in at least a portion of a channel state information-interference measurement (CSI-IM) resource, and the interference sequence signal is received from an interference base station (BS) when the interference signal is scheduled to transmit and corresponds to the interference sequence signal.

Alternatively or additionally, the interference configuration set may be configured with one or more interference configurations, and each interference configuration may include a plurality of fields indicating characteristic of the interference signal.

Alternatively or additionally, the processor may be configured to receive information of time in which the interference configuration set or separate interference configuration can be effectively used.

Alternatively or additionally, the interference sequence signal may be mapped to each resource element (RE) corresponding to the at least a portion of the CSI-IM resource for all antenna ports, and a seed value of the interference sequence signal may be changed for the each RE according to a frequency, time, and a transmission antenna port.

Alternatively or additionally, the interference sequence signal may be mapped to a resource element (RE) corresponding to at least a portion of the CSI-IM resource by applying an orthogonal cover code (OCC), and a seed value of the interference sequence signal may be changed for the each RE according to a frequency, time, and a transmission antenna port.

Alternatively or additionally, a seed value of the interference sequence signal may be changed according to an interference configuration set or separate interference configuration configured for each respective frequency resource unit.

Alternatively or additionally, a seed value of the interference sequence signal may be determined according to an offset value based on at least one of an index of a transmission antenna port and a frequency domain in which the interference signal is transmitted or a subframe index in which the interference sequence signal is transmitted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
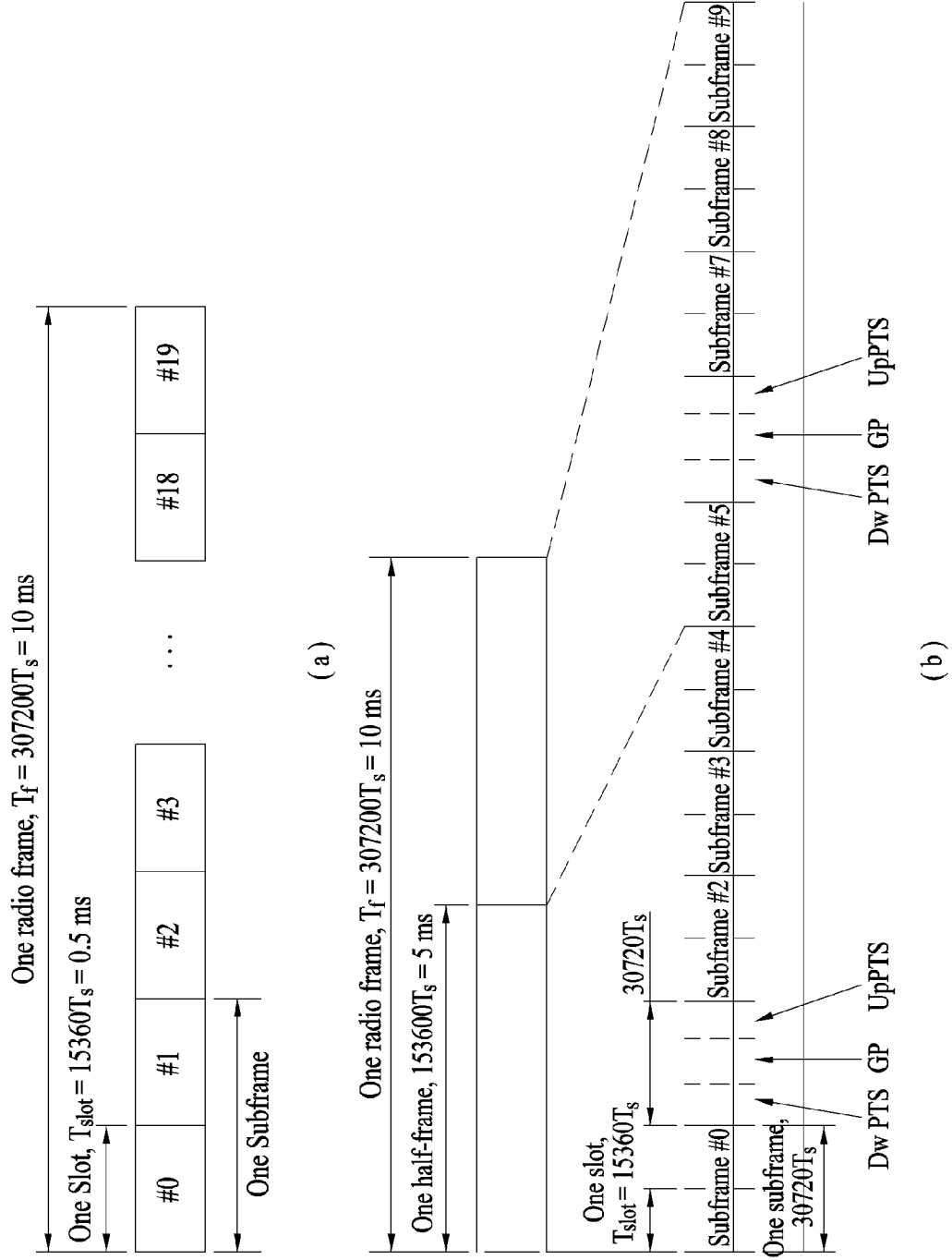
FIG. 1 illustrates an example of a wireless frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
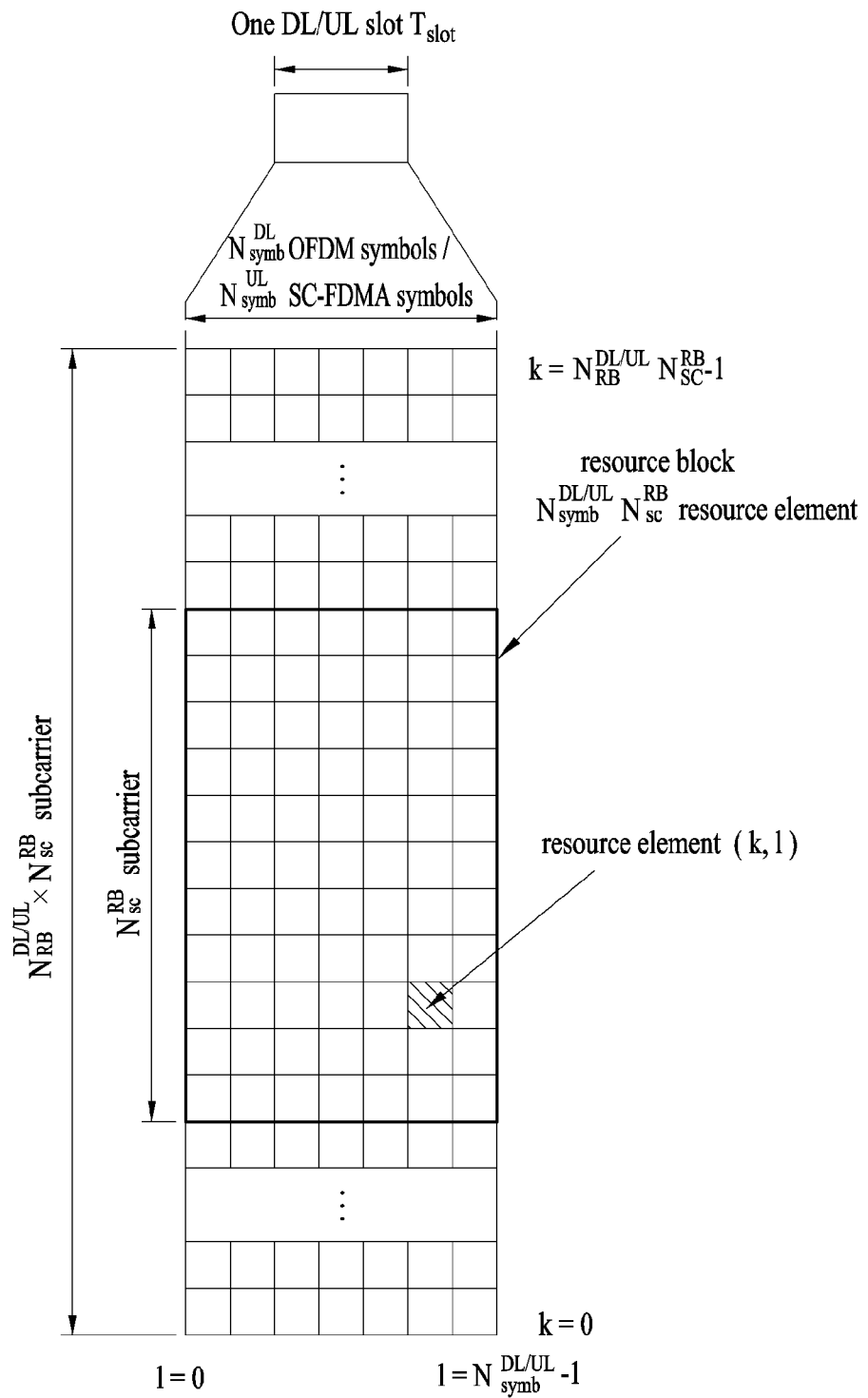
FIG. 2 illustrates an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone.

Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
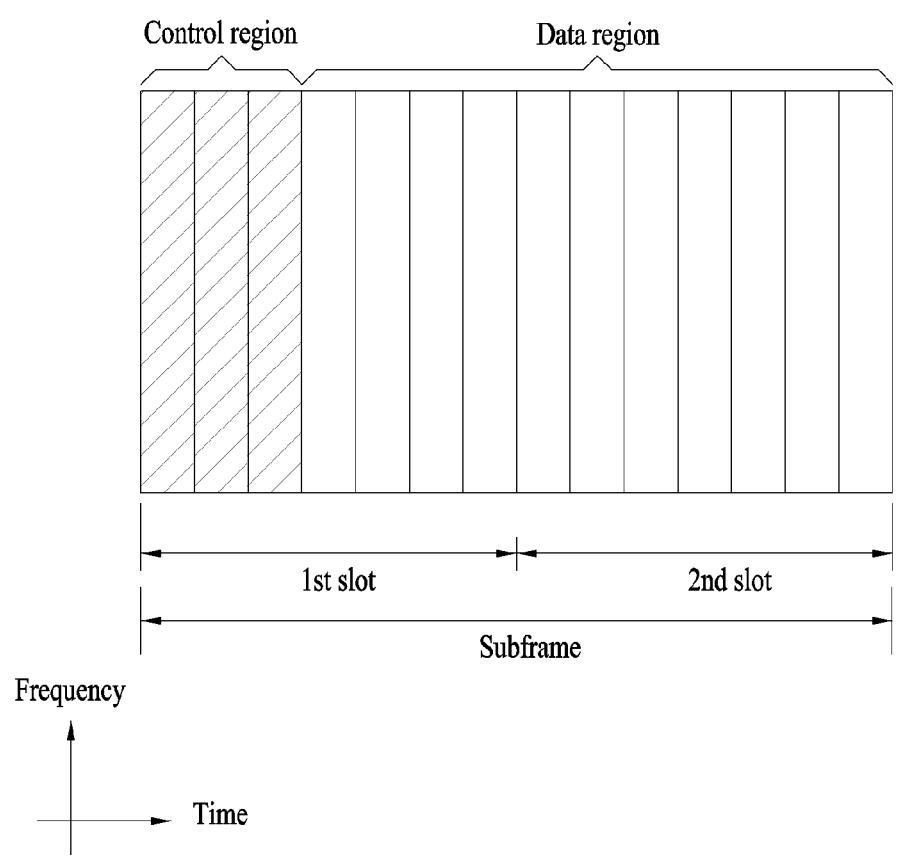
FIG. 3 illustrates an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
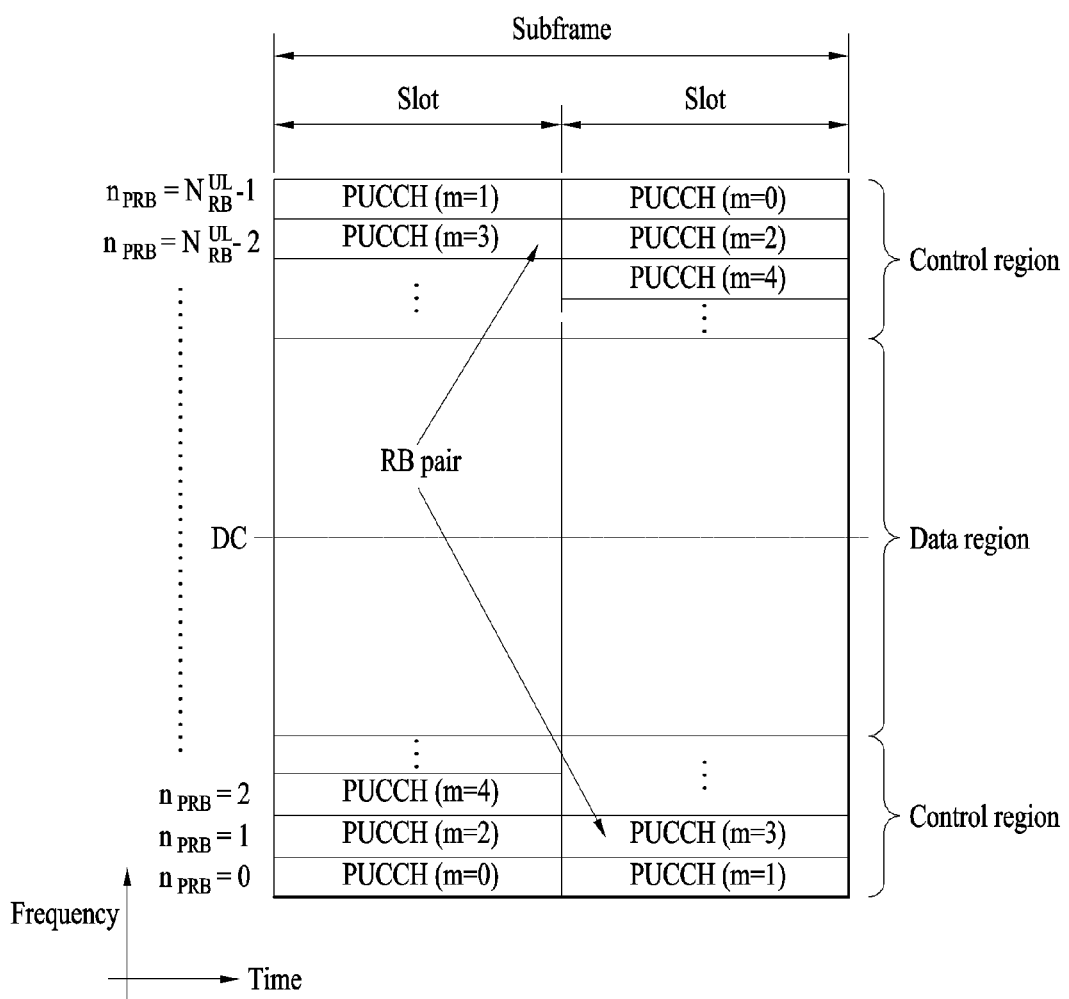
FIG. 4 illustrates an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-Reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, ..., 18, and p=15, ..., 22), and CSI-RS may be defined only for Δf=15 kHz. The antenna ports (p=15, ..., 22) may correspond to CSI-RS ports (p=0, ..., 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type 1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).
Number of CSI-RS ports
CSI-RS structure
CSI-RS subframe configuration $I_{CSI-RS}$
CSI-RS subframe configuration period $T_{CSI-RS}$
CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM(Interference Measurement)
For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

A wireless communication system such as LTE, etc. receives CSI feedback from a UE in order to determine a data transmission method such as scheduling, precoding, modulation and coding scheme (MCS), etc. For example, in LTE Rel-11, an eNB may allocate a CSI-RS as a reference signal (RS) for data channel measurement and a CSI-interference measurement (IM) resource as resource for interference measurement to the UE in order to perform the CSI feedback. In this case, a combination of the one CSI-RS and the one CSI-IM resource may be defined as a CSI process. The UE to which the CSI process is allocated measures reception intensity and spatial characteristics of a received signal from the CSI-RS, measures interference intensity and spatial characteristics of an interference signal from the CSI-IM resource, determines a rank indicator (RI), a precoding matrix indicator (PMI), and a channel quality indicator (CQI) of the corresponding CSI process, and reports them to the eNB. In a LTE Rel-11 system, the UE may be allocated with a plurality of CSI processes so as to receive data transmission according to a coordinated multiple point transmission/reception (CoMP) scheme from a plurality of cells. In addition, the UE feedbacks CSI extracted from each CSI process according to an independent period and sub-frame offset.

Figure 5:
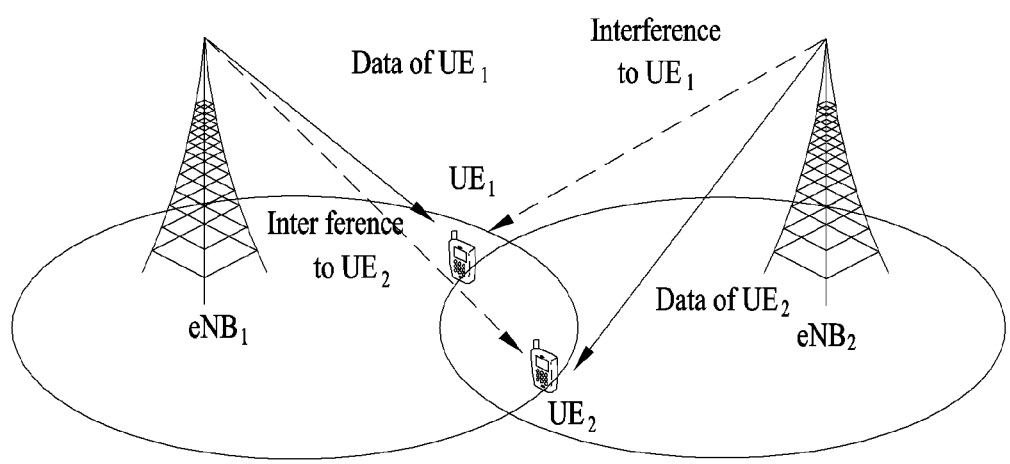
FIG. 5 illustrates an interference environment in a multi-cell environment.

In an evolved wireless communication system such as LTE Rel-12, etc., a network assisted interference cancellation and suppression (NAICS) scheme for cancelling interference from an adjacent eNB by the UE based on help of a network has been discussed. FIG. 5 illustrates an interference environment in which data transmitted to $UE_1$ from $eNB_1$ exerts interference effect on $UE_2$ and simultaneously data transmitted to $UE_2$ from $eNB_2$ exerts interference effect on $UE_1$ when $UE_1$ served by $eNB_1$ and $UE_2$ served by $eNB_2$ are present in an LTE system. In FIG. 5, for an NAICS scheme, $UE_1$ or $UE_2$ may attempt to demodulate or decode data of an adjacent eNB and then alleviate interference effect upon succeeding in cancelling interference data from the received signal.

With regard to the NAICS scheme of the LTE Rel-12 system, a method in which a network informs a UE of information about interference data has been discussed. As the information about the interference data, semi-static parameters such as a transmission mode (TM), a cell ID, multicast broadcast single frequency network (MBSFN) configuration, number of CRS antenna ports, transmission power information (e.g., $P_A$ and $P_B$), etc., dynamic parameters such as a control format indicator (CFI), a precoding matrix indicator (PMI), a rank indicator (RI), a modulation order and coding scheme (MCS), number of DMRS antenna ports, resource allocation, a DMRS sequence, etc., and deployment parameters such as synchronization, cyclic prefix (CP), subframe/slot alignment, etc. have been discussed. However, According to the NAICS scheme, since non-ideal backhaul between cells is assumed, it is difficult to dynamically signal information about interference data. Accordingly, a method of semi-statically signaling interference data via NIB by an adjacent cell and simultaneously limiting data scheduling of the adjacent cell has been considered. However, the data scheduling limitation may degrade system performance in an adjacent cell and may not be appropriate.

Accordingly, the present invention proposes a method in which an adjacent cell pre-configures a plurality of interference configurations, informs a UE performing the NAICS scheme of the interference configurations, and configures a sequence of an interference-sequence signal (I-SS) corresponding to each interference configuration, and then the UE performing the NAICS scheme recognizes information of currently applied interference configuration via sequence detection of I-SS.

Hereinafter, a detailed operation according to the present invention will be described in terms of an LTE system according to an embodiment of the present invention. However, the above operations can be extensively applied to an arbitrary wireless communication system that provides interference information for a NAICS UE.

According to detailed embodiments of the present invention, interference configuration represented by a combination of a plurality of interference related information (e.g. RS type, PMI, RI, modulation order, and $P_A$) may be defined, the interference configuration may correspond to a sequence of I-SS transmitted from an adjacent cell that transmits an interference signal in terms of an NAICS UE, and this correspondence may be signaled to the NAICS UE. The interference configuration may indicate the characteristics of single interference data or the characteristics of interference data according to a plurality of PDSCHs that can be present during a predetermined period of time. For example, when RS type, PMI, RI, modulation order, and $P_A$ are considered as the characteristics of interference data, information about single interference data may be shown in the following table.

TABLE 5

| | RS type | PMI | RI | Modulation order | $P_A$ |
|---|---|---|---|---|---|
| Interference configuration 0 | CRS | $PMI_1$ | Rank 2 | 16QAM | −4.77 dB |

In the above table, RS type may refer to a type of RS for demodulation and may be a cell specific reference signal (CRS) or a demodulation reference signal (DMRS) in an LTE system according to an embodiment of the present invention. In this case, when a plurality of interference configurations is present, an I-SS sequence for classification of interference configuration may be defined as follows.

TABLE 6

| SS sequence | Interference configuration |
|---|---|
| I-SS sequence 0 | Interference configuration 0 configured by higher layer signaling |
| I-SS sequence 1 | Interference configuration 1 configured by higher layer signaling |
| I-SS sequence 2 | Interference configuration 2 configured by higher layer signaling |
| I-SS sequence 3 | Interference configuration 3 configured by higher layer signaling |

That is, different configurations may be configured to have respective different I-SS sequences. Thus, a UE that performs the NAICS scheme may recognize interference configuration via a sequence of I-SS detected by the UE. In this case, a value corresponding to "Null" may be allocated to a specific I-SS sequence and may indicate that any information about interference is not ensured when a corresponding I-SS sequence is detected. In addition, correspondence between the I-SS sequence and the interference configuration may be configured for each respective frequency resource (e.g. PRB).

Figure 6:
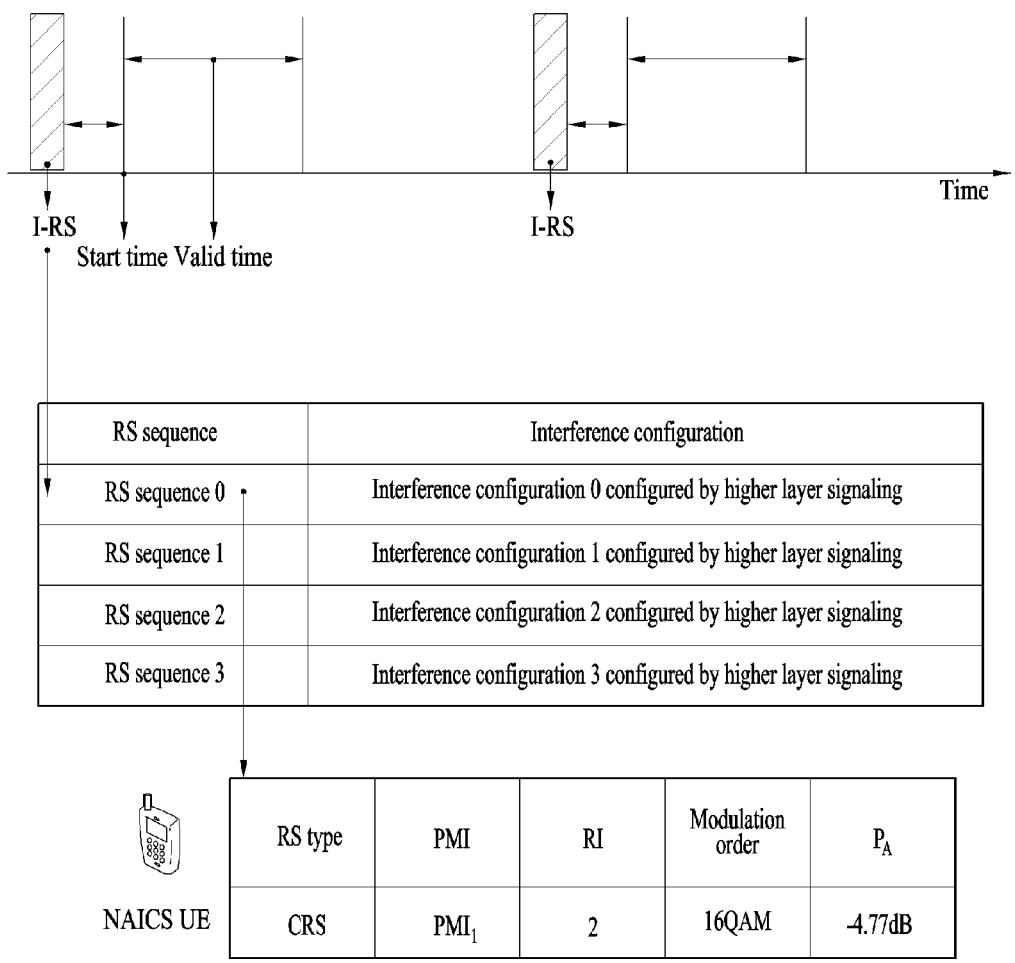
FIG. 6 illustrates signaling of an interference configuration set according to an embodiment of the present invention.

According to a detailed embodiment of the present invention, when a UE that performs the NAICS scheme detects a specific I-SS sequence and recognizes a specific interference configuration, the UE may signal a time period in which corresponding interference configuration is effective. Start time and effective period to which the specific interference configuration is effectively applied based on a time point in which the specific I-SS sequence is transmitted may be signaled to the UE that performs the NAICS scheme. FIG. 6 illustrates an effective time period of interference configuration corresponding to the I-SS according to detection of corresponding I-SS.

According to a detailed embodiment of the present invention, a method of using DMRS transmitted from an adjacent cell for I-SS will be described below. According to an embodiment of the present invention, in a LTE system, data conforming to a transmission method of TM9 or TM10 is transmitted together with data using a DMRS as an RS for data modulation. A seed value of a sequence of the DMRS may be designed to be dynamically allocated as a value of $n_{ID}(0)$ or $n_{ID}(1)$ according to a value of nSCID of information in downlink control information (DCI) transmitted via a control channel, that is, 0 or 1 in order to support a dynamic point selection (DPS) scheme as one of CoMP operations in LTE Rel-11. Thus, different interference configurations may be respectively allocated to the two I-SS sequences to use DMRS as I-SS.

TABLE 7

| Seed for SS sequence | Interference configuration |
|---|---|
| $n_{ID}^{(0)}$ | Null |
| $n_{ID}^{(1)}$ | Interference configuration 0 configured by higher layer signaling |

According to the above table, when $n_{ID}(0)$ is used as a seed value of an I-SS sequence, any limitation is not applied to data transmission in an adjacent cell, and when $n_{ID}(1)$ is used as a seed value of an I-SS sequence, limitation based on interference configuration 0 is applied to data transmission in an adjacent cell.

Figure 7:
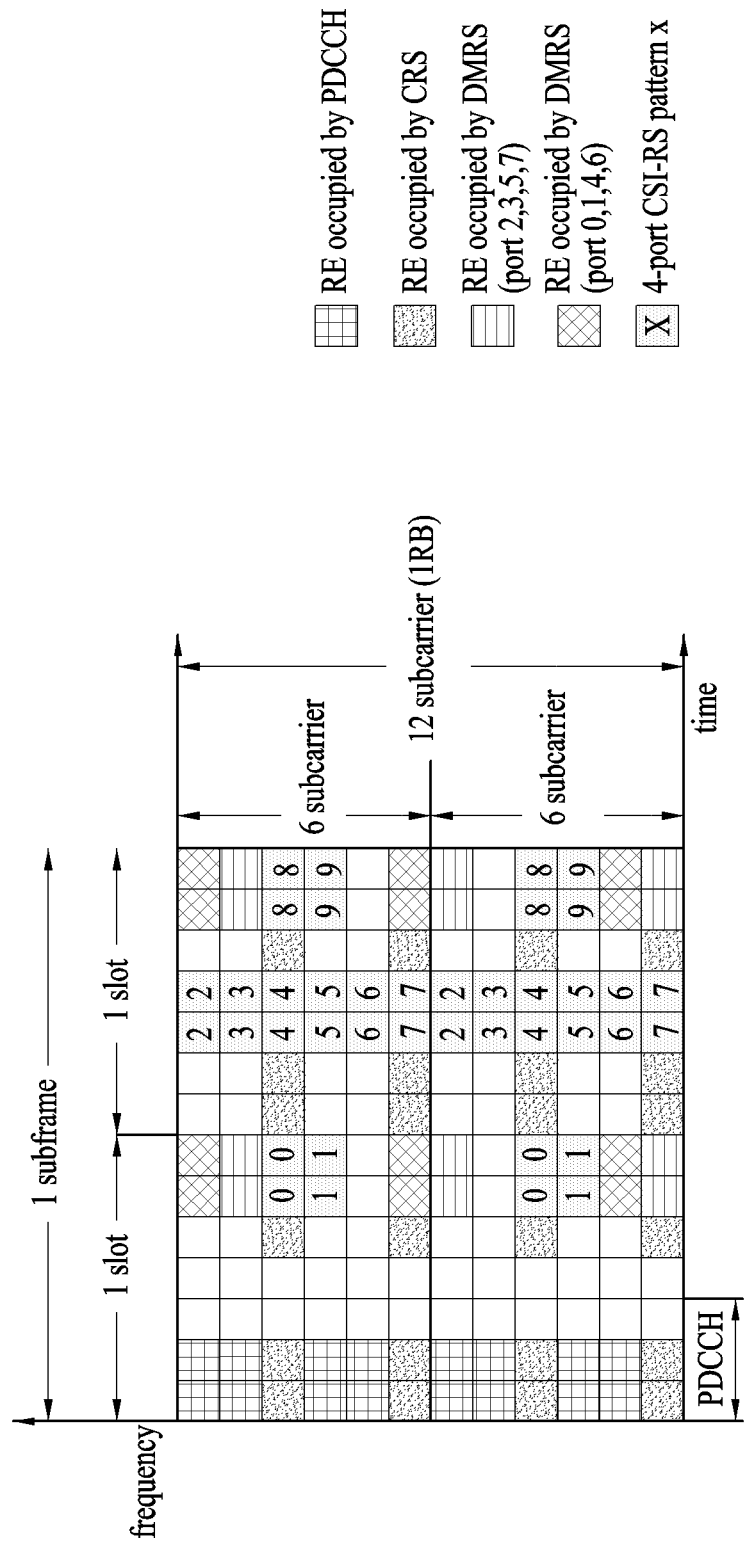
FIG. 7 illustrates a pattern of channel state information-reference signal (CSI-RS).

According to a detailed embodiment of the present invention, some of CSI-IM resources or CSI-IM resources of UEs that perform NAICS may be configured for I-SS transmission. When a DMRS is used as I-SS, it is disadvantageous that the DMRS is effective only when DMRS-based data transmission such as TM9 or TM10 is performed. When CRS-based data transmission such as TM4 is performed, since a DMRS is not transmitted together with data, I-SS about CRS-based data cannot be replaced with the DMRS and a separate resource is necessary. However, it is not preferable to unnecessarily enhance RS resources during a CRS-based data transmission procedure. Accordingly, a method for minimizing additional resource allocation by limiting a CSI-IM resource and transmitting I-SS may be considered. In LTE Rel-11 according to an embodiment of the present invention, a CSI-IM resource as a measurement resource for measuring interference of an adjacent cell may be present, and when a normal CP is applied, the CSI-IM may be configured as one of 10 4-port CSI-RS patterns illustrated in FIG. 7. In addition, the CSI-IM has periodicity like CSI-RS.

In this case, a resource for transmission of the I-SS may be configured with one or more CSI-IM resources or may be some of CSI-IM resources. That is, the resource for transmission of the I-SS may be a subset of the CSI-IM resource. For example, in FIG. 7, when 4-port CSI-RS pattern 0 is configured as a CSI-IM resource, the I-SS may be transmitted with a period that is a multiple of CSI-IM resource period in the 4-port CSI-RS pattern 0. In this case, even if the I-SS is transmitted in the CSI-IM resource, when the CSI-IM period is sufficiently short, it may be expected that data characteristics are not easily changed and that interference configuration is effective for a predetermined time period indicated via a sequence of the I-SS.

According to a detailed embodiment of the present invention, when CSI-IM resources of UEs that perform NAICS or some thereof are configured to transmit the I-SS, an interference cell (or a neighboring cell) may transmit an interference signal that conforms to interference configuration corresponding to the sequence of the I-SS at a transmission time point of the I-SS. When the I-SS is transmitted in a CSI-IM resource according to an operation according to the present invention, the UE that performs the NAICS scheme may perform blind detection (BD) on the sequence of the I-SS to detect the sequence and to check interference configuration based thereon. In this case, even if interference data can be transmitted to the CSI-IM resource in terms of the interference cell, the I-SS may be transmitted such that transmission resource of data may be lost even if the lost resource is low. Accordingly, the interference cell may transmit data only when an interference signal is actually present at a time point in which the I-SS is transmitted and the interference signal conforms to interference configuration corresponding to the sequence of the I-SS.

According to another detailed embodiment of the present invention, the I-SS may be transmitted through antenna ports, the number of which corresponds to the number of layers of interference data transmitted from an interference cell, and each antenna port of the I-SS may be divided with regard to REs in the CSI-IM resource by applying an orthogonal cover code (OCC) to the REs. The CSI-IM resource is not a resource only for a UE that performs the NAICS scheme. Accordingly, UEs that do not perform the NAICS scheme may still measure interference in the CSI-IM resource and consider that data of an adjacent cell or interference cell in the corresponding CSI-IM resource. Accordingly, the present invention proposes a method of transmitting I-SS similar to data of an adjacent cell or interference cell in order to transmit the I-SS as long as a main objective of the CSI-IM resource is not damaged.

To this end, with regard to the I-SS, it is necessary to exclude component considered to channel estimation unlike an existing DMRS. That is, with regard to the existing DMRS, antenna ports are divided into frequency division modulation (FDM) in the frequency axis or code division modulation (CDM) based on an orthogonal cover code (OCC). However, the I-SS needs to be seen to be similar to data as most as possible, antenna ports need to be divided via the CDM scheme. For example, it is assumed that the number of transmission antennas is M, the number of reception antennas is N, and the number of layers of data is L. In this case, channel H may be represented as an N×M matrix, precoding matrix P may be represented as a M×L matrix, noise signal n may be represented as a M×1 matrix, I-SS x may be represented as an L×1 matrix, and received signal y may be represented as follows.

$$y = HPx + n \quad \text{[Equation 1]}$$

In this case, it is assumed that OCC is applied to L REs and a value of a code applied to a first RE for an $i^{th}$ antenna port is $w_i^{(l)}$. In this case, a sample covariance matrix obtained by averaging $yy^H$ for the L REs may be represented as follows.

$$\tilde{R} = \frac{1}{L} \sum_{l=0}^{L-1} (HPx(l) + n(l))(HPx(l) + n(l))^H \quad \text{[Equation 2]}$$

$$= HP\left(\frac{1}{L}\sum_{l=0}^{L-1} x(l)x(l)^H\right)P^H H + \frac{1}{L}\sum_{l=0}^{L-1} n(l)n(l)^H$$

$$= HPR_x P^H H + \frac{1}{L}\sum_{l=0}^{L-1} n(l)n(l)^H$$

In this case, an element of an $i^{th}$ row and a $j^{th}$ column of $R_x$ may be represented as follows.

$$\{R_x\}_{ij} = \frac{1}{L}\sum_{l=0}^{L-1} w_i(l) w_j^*(l) s_i s_j^* \quad \text{[Equation 3]}$$

$$= \sum_{l=0}^{L-1} s_i s_j^* w_i w_j^H$$

$$= \frac{1}{L} s_i s_j^* L \delta_{ij}$$

Here, $s_i$ refers to an I-SS sequence for an $i^{th}$ antenna port and $\delta_{ij}$ refers to Kronecker delta. Thus, $R_x = I$ and Equation 2 may be represented as follows.

$$\tilde{R} = HPP^H H + \frac{1}{L}\sum_{l=0}^{L-1} n(l)n(l)^H \quad \text{[Equation 4]}$$

As seen from Equation 4 above, when the I-SS of each antenna port is divided based on OCC, a sample covariance matrix may also be unconditionally obtained on an interference signal for REs that perform CDM. Accordingly, according to an embodiment of the present invention, the I-SS may have antenna ports, the number of which corresponds to the number of layers of interference data transmitted from an adjacent cell, and each antenna port of the I-SS may be divided based on OCC for REs in a CSI-IM resource. In this case, I-SS sequences transmitted in antenna ports may be configured with pseudorandom noise (PN) sequences having different seed values, respectively.

An example in which the I-SS is mapped to REs of a CSI-IM resource will be described below.

Figure 8:
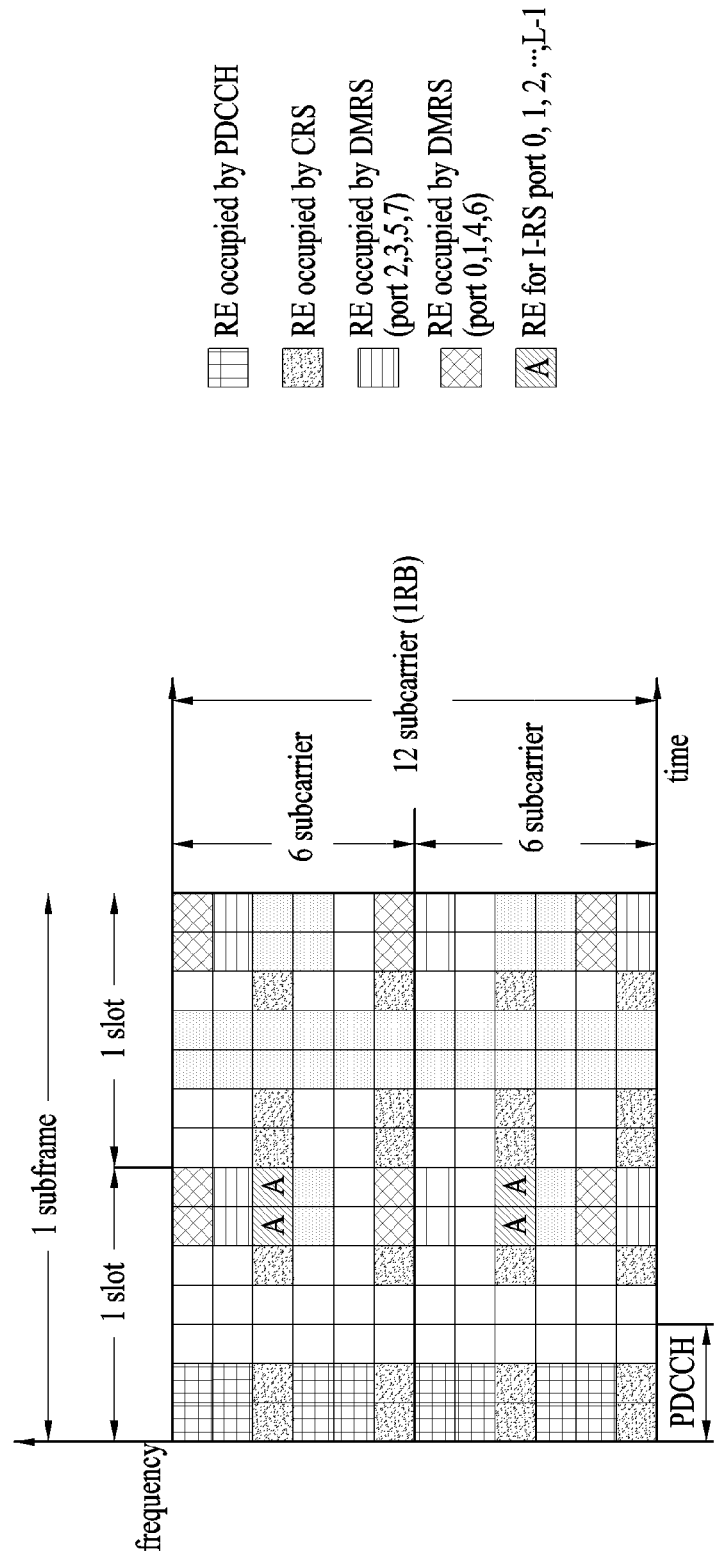
FIG. 8 to FIG. 11 illustrate resources in which interference sequence signal is transmitted in accordance with an embodiment of the present invention.

FIG. 8 illustrates an example in which OCC is not applied to I-SS. When OCC is applied, effect based on OCC is cancelled only when average is obtained in a unit in which the corresponding OCC is applied, and there is no guarantee that a covariance matrix of an interference signal is measured by achieving average by all UEs, and thus the UE can be unlimitedly embodied only when the OCC is not applied. In this case, I-SS sequences for all antenna ports of I-SS may be transmitted to one RE, and it is preferable to change a seed value of an I-SS sequence according to an antenna port and an RE position in the frequency and time axis in order to provide randomness.

Figure 9:
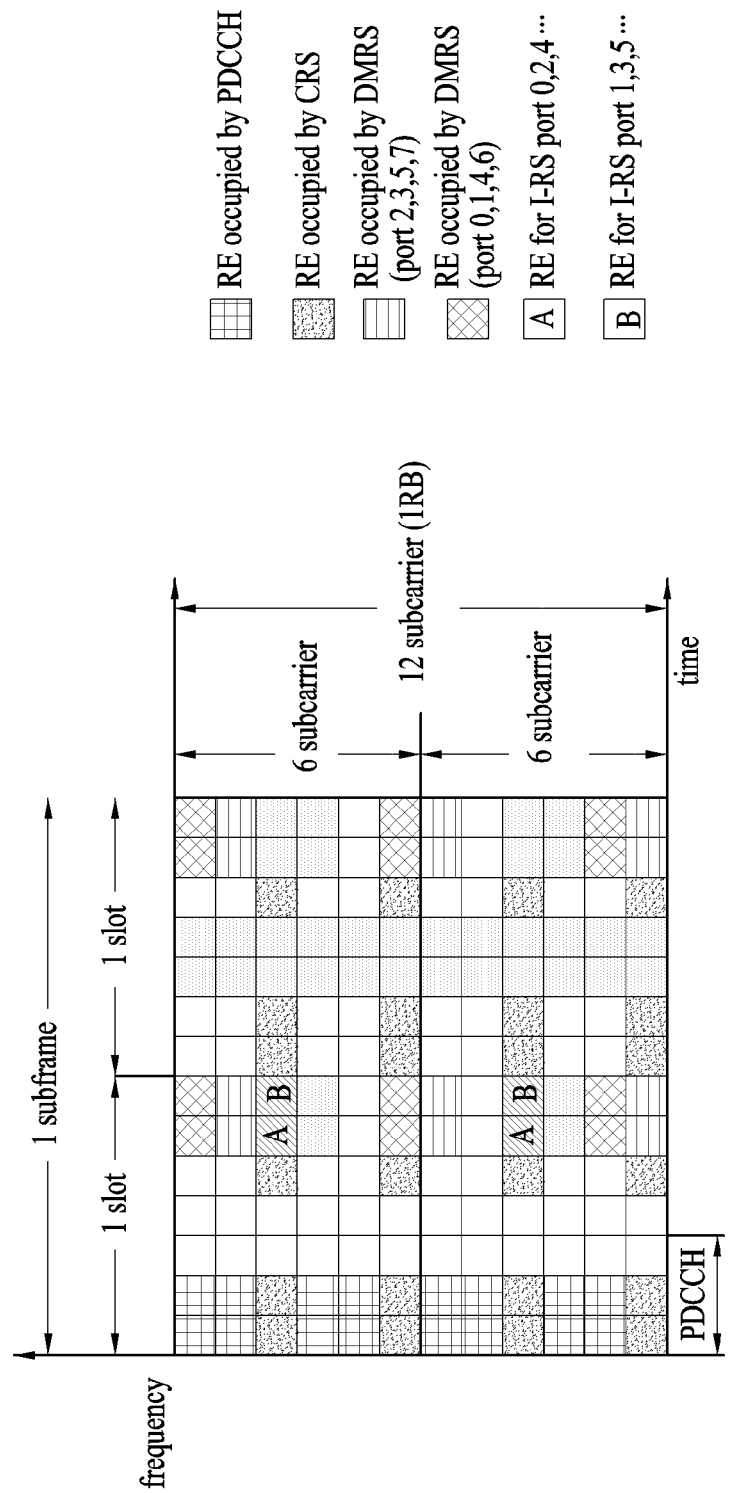

FIG. 9 illustrates an example in which OCC with a length of 2 is applied to I-SS. In this case, when each antenna port of I-SS is divided based on FDM, since it is difficult to expect the same effect as data, only CDM based on OCC is supported, and accordingly, when the I-SS has two layers, orthogonality can be ensured, but when the number of the layers is two or more, orthogonality cannot be ensured. Similarly to FIG. 8, it is preferable to change a seed value of an I-SS sequence according to an antenna port and an RE position in the frequency axis in order to given randomness.

According to another detailed embodiment of the present invention, difference seed values of I-SS may be transmitted for respective frequency resource units according to corresponding interference configuration for each frequency resource unit. However, an offset value of the seed may be achieved according to an antenna port and an RE position in a frequency resource unit. For example, Table 6 above may be re-represented as follows.

TABLE 8

| Seed for SS sequence | Interference configuration |
| --- | --- |
| $n_{ID}^{(0)}$ | Interference configuration 0 configured by higher layer signaling |
| $n_{ID}^{(1)}$ | Interference configuration 1 configured by higher layer signaling |
| $n_{ID}^{(2)}$ | Interference configuration 2 configured by higher layer signaling |
| $n_{ID}^{(3)}$ | Interference configuration 3 configured by higher layer signaling |

Here, $n_{ID}^{(i)}$ refers to a seed of an I-SS sequence for $i^{th}$ interference configuration. In addition, when I-SS is configured as illustrated in FIG. 9, an offset value for the I-SS sequence can be reduced as follows.

TABLE 9

| Frequency index | Offset |
| --- | --- |
| 3 | $n_p$ |
| 9 | $n_p + 1$ |

Here, $n_p$ refers to an offset value configured according to antenna port index p. In addition, in consideration of randomness in a subframe unit, $n_s$ configured according to subframe index s may be additionally considered. For example, the following seed value may be considered for a sequence of I-SS transmitted in a specific frequency resource.

TABLE 10

| Frequency index | Seed |
| --- | --- |
| 3 | $n_{ID}^{(i)} + n_p + n_s$ |
| 9 | $n_{ID}^{(i)} + n_p + n_s + 1$ |

According to another detailed embodiment of the present invention, when a cell (e.g. Cell$_1$) that serves a UE performing the NAICS scheme and a cell (e.g. Cell$_2$) that interferes with the UE performing the NAICS scheme are present, a method of configuring a zero power (ZP) CSI-RS resource that is pre-determined between each other and transmitting I-SS through the ZP CSI-RS resource by the Cell$_2$ will be described. The aforementioned method of transmitting I-SS using a CSI-IM resource according to the present invention may be considered as a method of allowing random data interference to be seen to exerted in the corresponding CSI-IM resource for the UE that does not perform the NAICS scheme while facilitating detection of a sequence of specific I-SS for the UE performing the NAICS scheme. For example, when Cell$_1$ serves the UE performing the NAICS scheme and Cell$_2$ transmits I-SS in order to provide information about an interference signal, Cell$_2$ is configured to transmit I-SS to a resource used as a CSI-IM resource for Rel-12 UEs that perform the NAICS scheme. Accordingly, it is advantageous that I-SS is additionally transmitted only when Cell$_2$ transmits interference data and transmits interference configuration corresponding thereto, thereby minimizing resource exhaustion for transmission of I-SS. However, in order to transmit more reliable interference information, it is preferable to design a PN sequence, etc. such that the I-SS has random data interference characteristic, but this may not be preferable in terms of detection performance. Accordingly, according to an embodiment of the present invention, when Cell$_1$ that serves a UE that performs the NAICS scheme and Cell$_2$ that interferes with the UE that performs the NAICS scheme are present, a ZP CSI-RS resource that is pre-determined between each other may be configured and Cell$_2$ may transmit I-SS through the ZP CSI-RS resource. Here, the UE that performs the NAICS scheme may receive ZP CSI-RS resource information for transmission of the I-SS from Cell$_1$ that serves data of the UE via a higher layer signal.

Figure 10:
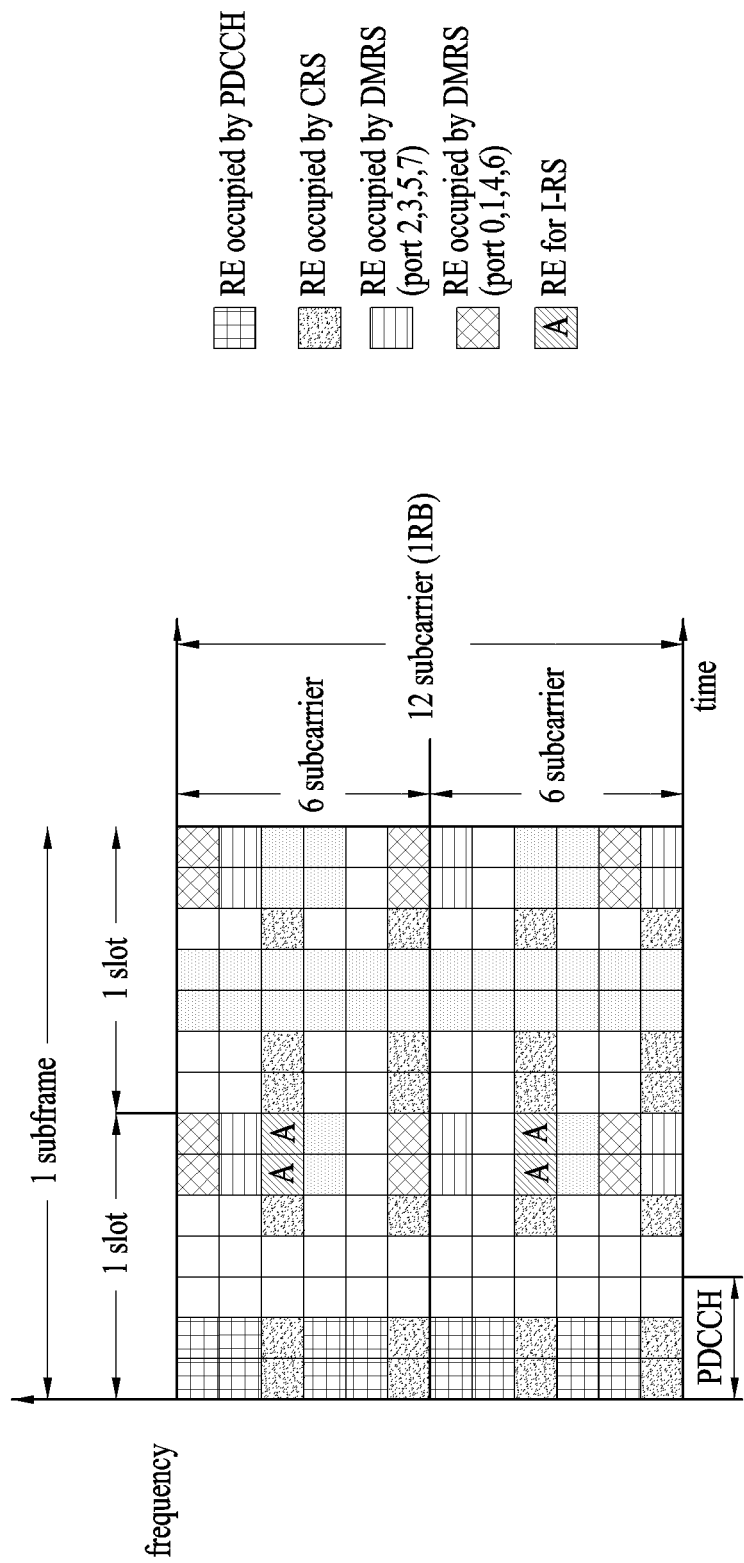

According to another detailed embodiment of the present invention, when I-SS is transmitted using the ZP CSI-RS resource, a method of configuring REs corresponding to a ZP CSI-RS resource configured for transmission of I-SS in each PRB as one resource element group (REG) and transmitting information indicating interference configuration, i.e. I-SS using REGs belonging to a plurality of PRBs as one transmission unit will be described below. For example, in FIG. 10, four REs indicated by "A" may be configured as one REG.

Figure 11:
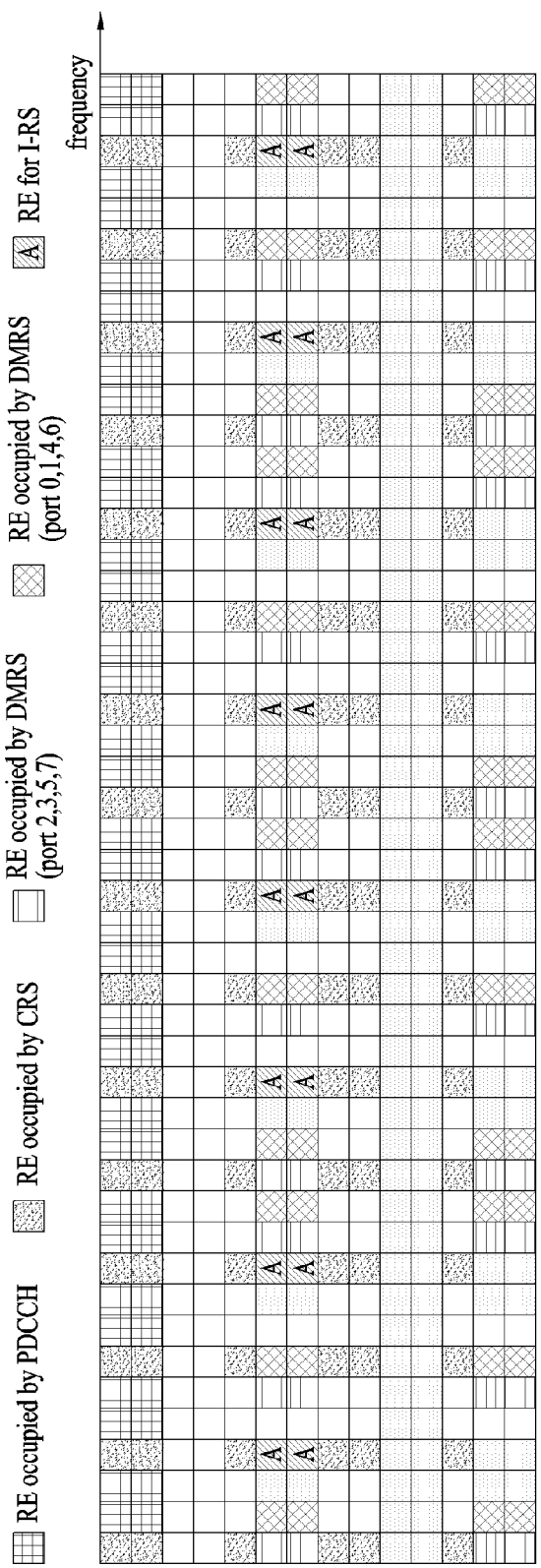

In this case, as illustrated in FIG. 11, when a transmission unit to which interference configuration is applied is assumed to be four PRBs, a QPSK symbol may be transmitted for 16 of total REs to transmit 32 of total bits.

According to another detailed embodiment of the present invention, as in the aforementioned embodiment, the following method will be described: when I-SS is transmitted using a ZP CSI-RS resource, REs belonging to a ZP CSI-RS resource configured for transmission of I-SS of each PRB may be configured as one resource element group (REG), and when information indicating interference configuration is transmitted using REGs belonging to a plurality of PRBs as one transmission unit, the interference configuration is four or less, information indicating the interference is configured in repetition form of a simplex code. As in FIG. 11, when a transmission unit for transmission of interference configuration is four PRBs, if a QPSK symbol is transmitted for 16 of total REs to transmit 32 of total bits, the 32 bits may be configured according to the following table.

TABLE 11

| Interference configuration | $<b_0, b_1, \ldots, b_{31}>$ |
|---|---|
| 0 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 1 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 2 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| Null | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The information is configured in repetition form of a simplex code of (0, 1, 1), (1, 0, 1), and (1, 1, 0), and a code corresponding to the information may be generated by repeating the simplex code by as much as a length corresponding to a corresponding transmission unit when the transmission unit is not four PRBs. In addition, when interference configuration is M bits and the amount of information to be transmitted in a transmission unit configured with REGs belonging to a plurality of PRBs is N bits (e.g. N>=M), the information of the interference configuration may be embodied via a random coding scheme having a coding rate of M/N. For example, a linear block code, a convolutional code, or the like may be used.

The information of the interference configuration may also be transmitted and signaled to the UE that is served by an interference cell that transmits the I-SS by pre-transmitting configuration information of I-SS via a higher layer signal such as RRC, etc. In this case, the UE that is served in an interference cell may use the information about the interference configuration as an additional reference signal (RS).

Figure 12:
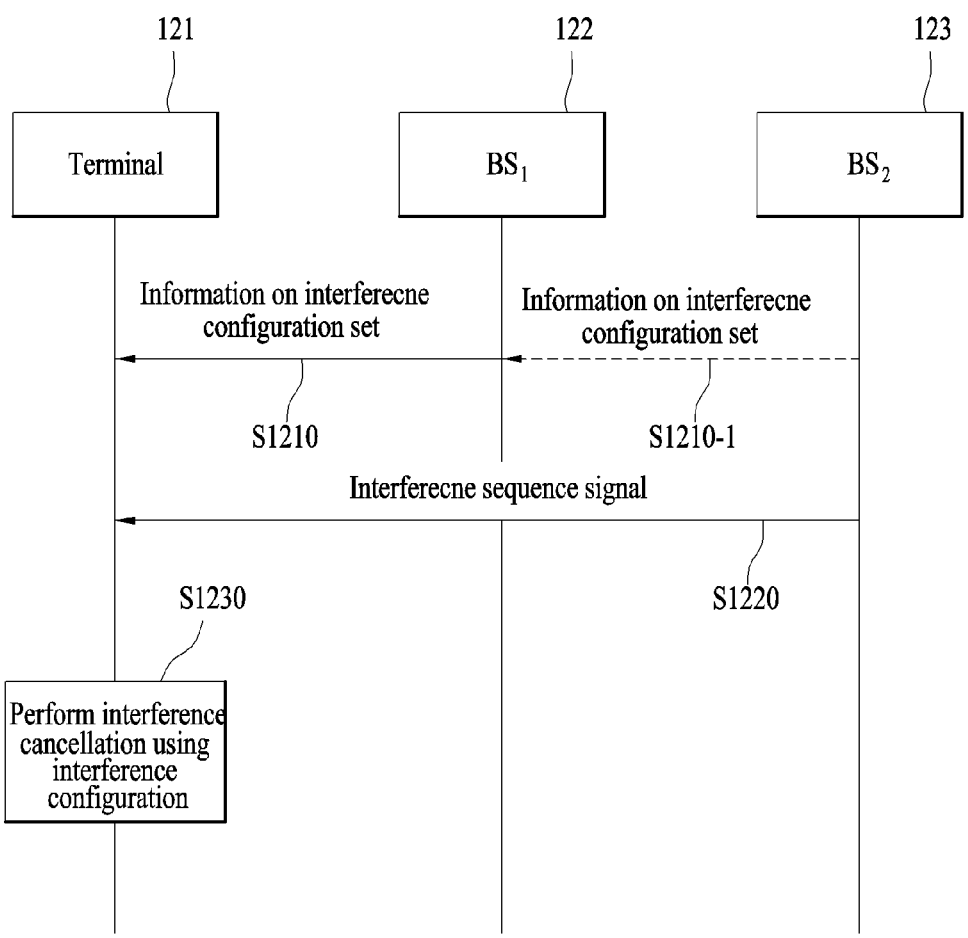
FIG. 12 illustrates an operation in accordance with an embodiment of the present invention.

FIG. 12 illustrates an operation associated with interference cancellation using interference configuration reception and interference configuration according to an embodiment of the present invention.

A terminal 121 may receive information of an interference configuration set associated with an interference signal from a BS$_1$ 122 as a serving BS (S1210). The information of the interference configuration set may be pre-received by the BS$_1$ from a BS$_2$ 123 (S1210-1). Alternatively, the BS$_2$ 123 may transmit information about an interference configuration set associated with the interference signal characteristic directly to the terminal 121. The BS$_2$ 123 corresponds to an interference BS that transmits the interference signal. The interference configuration set may be configured with one or more interference configurations and each interference configuration may include a plurality of fields indicating the characteristic of the interference signal. In addition, the interference configuration set may be configured for each respective subframe set or each respective specific frequency resource unit.

For example, the interference configuration set may be a set of interference configuration in the form shown in the aforementioned Table 5.

The terminal 121 may receive an interference sequence signal indicating one interference configuration of the interference configuration set (S1220). The interference sequence signal may be transmitted in at least a portion of a channel state information-interference measurement (CSI-IM) resource, and the interference sequence signal may be transmitted from the interference BS when the interference signal is scheduled and corresponds to the interference sequence signal.

Then the terminal may perform cancellation of an interference signal using the indicated interference configuration (S1230).

The terminal may receive time information when the interference configuration set or separate interference configuration can be effectively used. Thus, the indicated interference configuration is effective only in the effective time and accordingly can be used to cancel the interference signal only in the effective time. That is, this means that downlink transmission according to the interference configuration is ensured by the BS$_2$ only in the effective time.

In addition, the terminal may recognize information about a subframe in which information about a period for transmission of the interference sequence signal or the indicator is transmitted. The interference sequence signal is transmitted in at least a portion of the configured CSI-IM resource, and thus a transmission period of the interference sequence may correspond to an integer multiple of a period of the CSI-IM resource. Thus, when information indicated by the integer is provided to the terminal, the terminal may recognize the transmission period of the interference sequence signal and may also recognize information about a subframe via configuration of the CSI-IM resource. Thus, the terminal may reduce a number of times of blind detection for detection of the indicator.

In addition, the interference sequence signal may be mapped to each resource element (RE) corresponding to at least a portion of the CSI-IM resource for all antenna ports, and a seed value of the interference sequence signal may be changed according to a frequency, time, and transmission antenna port of each RE.

The interference sequence signal may be mapped to a resource element (RE) corresponding to at least a portion of the CSI-IM resource by applying an orthogonal cover code (OCC), and a seed value of the interference sequence signal may be changed according to a frequency, time, and transmission antenna port of each RE.

The seed value of the interference sequence signal may be changed according to separate interference configuration or an interference configuration set configured for each respective frequency resource unit.

In addition, the seed value of the interference sequence signal may be determined according to an offset value based on at least one of an index of a transmission antenna port and a frequency domain in which the interference signal is transmitted or a subframe index in which the interference sequence signal is transmitted.

Figure 13:
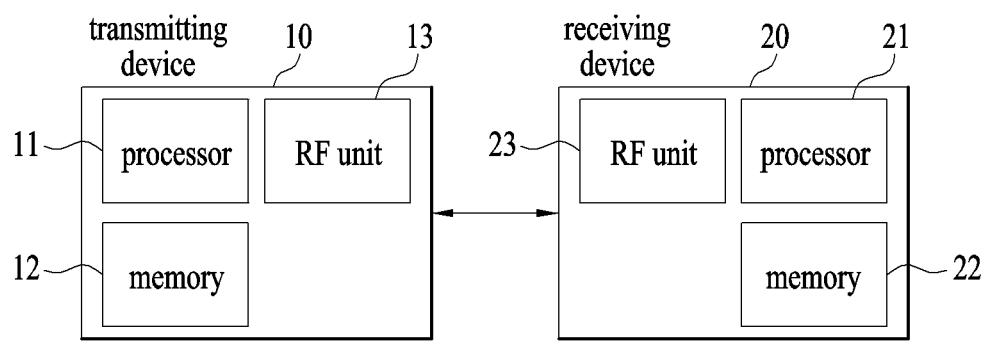
FIG. 13 is a block diagram of an apparatus for embodying embodiment(s) of the present invention.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

According to an embodiment of the present invention, an effective interference cancellation operation can be expected using information for interference cancellation.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method for performing interference cancellation in a wireless communication system, which is performed by a terminal, the method comprising:
   receiving information about an interference configuration set related to characteristic of an interference signal;
   receiving an interference sequence signal indicating one interference configuration of the interference configuration set; and
   performing cancellation of the interference signal using the indicated interference configuration,
   wherein the interference sequence signal is transmitted in at least a portion of a channel state information-interference measurement (CSI-IM) resource; and
   the interference sequence signal is received from an interference base station (BS) when the interference signal is scheduled to transmit and corresponds to the interference sequence signal.

2. The method according to claim 1, wherein:
   the interference configuration set is configured with one or more interference configurations; and
   each interference configuration comprises a plurality of fields indicating characteristic of the interference signal.

3. The method according to claim 1, further comprising receiving information of time in which the interference configuration set or separate interference configuration can be effectively used.

4. The method according to claim 1, wherein:
   the interference sequence signal is mapped to each resource element (RE) corresponding to the at least a portion of the CSI-IM resource for all antenna ports; and a seed value of the interference sequence signal is changed for the each RE according to a frequency, time, and a transmission antenna port.

5. The method according to claim 1, wherein:
the interference sequence signal is mapped to a resource element (RE) corresponding to at least a portion of the CSI-IM resource by applying an orthogonal cover code (OCC); and
a seed value of the interference sequence signal is changed for the each RE according to a frequency, time, and a transmission antenna port.

6. The method according to claim 1, wherein a seed value of the interference sequence signal is changed according to an interference configuration set or separate interference configuration configured for each respective frequency resource unit.

7. The method according to claim 1, wherein a seed value of the interference sequence signal is determined according to an offset value based on at least one of an index of a transmission antenna port and a frequency domain in which the interference signal is transmitted or a subframe index in which the interference sequence signal is transmitted.

8. A terminal configured to perform interference cancellation in a wireless communication system, comprising:
a radio frequency (RF) unit; and
a processor configured to configure the RF unit,
wherein the processor is configured to receive information about an interference configuration set related to characteristic of an interference signal, to receive an interference sequence signal indicating one interference configuration of the interference configuration set, and to perform cancellation of the interference signal using the indicated interference configuration;
wherein the interference sequence signal is received in at least a portion of a channel state information-interference measurement (CSI-IM) resource; and
the interference sequence signal is received from an interference base station (BS) when the interference signal is scheduled to transmit and corresponds to the interference sequence signal.

9. The terminal according to claim 8, wherein:
the interference configuration set is configured with one or more interference configurations; and
each interference configuration comprises a plurality of fields indicating characteristic of the interference signal.

10. The terminal according to claim 8, wherein the processor is configured to receive information of time in which the interference configuration set or separate interference configuration can be effectively used.

11. The terminal according to claim 8, wherein:
the interference sequence signal is mapped to each resource element (RE) corresponding to the at least a portion of the CSI-IM resource for all antenna ports; and
a seed value of the interference sequence signal is changed for the each RE according to a frequency, time, and a transmission antenna port.

12. The terminal according to claim 8, wherein:
the interference sequence signal is mapped to a resource element (RE) corresponding to at least a portion of the CSI-IM resource by applying an orthogonal cover code (OCC); and
a seed value of the interference sequence signal is changed for the each RE according to a frequency, time, and a transmission antenna port.

13. The terminal according to claim 8, wherein a seed value of the interference sequence signal is changed according to an interference configuration set or separate interference configuration configured for each respective frequency resource unit.

14. The terminal according to claim 8, wherein a seed value of the interference sequence signal is determined according to an offset value based on at least one of an index of a transmission antenna port and a frequency domain in which the interference signal is transmitted or a subframe index in which the interference sequence signal is transmitted.

* * * * *